United States Patent
Smith et al.

(10) Patent No.: US 6,470,003 B1
(45) Date of Patent: Oct. 22, 2002

(54) METHOD AND APPARATUS IN A TWO-WAY RADIO MESSAGING UNIT FOR LIMITING A TOTAL TRANSMISSION DURATION WITHIN A SLIDING TIME WINDOW

(75) Inventors: Brian Keith Smith, North Richland Hills, TX (US); Michael Scott Pieper, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/455,674

(22) Filed: Dec. 7, 1999

(51) Int. Cl.$^7$ ................................................. H04J 3/00
(52) U.S. Cl. ..................... 370/345; 370/235; 370/395.4; 370/412
(58) Field of Search ....................... 370/345, 235–236.2, 370/395.1–396, 400, 412–418; 455/466, 412, 426; 710/52–57

(56) References Cited

U.S. PATENT DOCUMENTS

| | | | | |
|---|---|---|---|---|
| 5,825,769 A | * | 10/1998 | O'Reilly et al. | ............ 370/360 |
| 6,144,855 A | * | 11/2000 | Slovin | ......................... 455/432 |
| 6,178,331 B1 | * | 1/2001 | Holmes et al. | .............. 455/466 |
| 6,282,424 B1 | * | 8/2001 | Wright et al. | ............... 455/450 |
| 6,366,761 B1 | * | 4/2002 | Montpetit | ................... 455/12.1 |
| 6,374,311 B1 | * | 4/2002 | Mahany et al. | ................ 710/18 |
| 6,400,695 B1 | * | 6/2002 | Chuah et al. | ................ 370/310 |

* cited by examiner

Primary Examiner—Edward F. Urban
Assistant Examiner—Charles Craver
(74) Attorney, Agent, or Firm—R. Louis Breeden

(57) ABSTRACT

A processing system (206) defines (302) a plurality of bins (230) within a sliding time window, each bin for storing a total transmit duration of a predetermined number of frames assigned to each bin. The processing system then determines (310) a mean transmit duration per frame for a next one of the plurality of bins to be processed. The processing system subtracts (312) the mean transmit duration per frame from the total transmit duration of the one of the plurality of bins, when a next frame begins to be processed; and calculates (314) a transmit duty cycle for the sliding time window, the transmit duty cycle calculated as if a requested transmit duration for the next frame were to be allowed. The processing system also delays (316) a transmission of the next frame, when the transmit duty cycle is greater than a maximum allowable transmit duty cycle.

17 Claims, 3 Drawing Sheets

METHOD AND APPARATUS IN A TWO-WAY RADIO MESSAGING UNIT FOR LIMITING A TOTAL TRANSMISSION DURATION WITHIN A SLIDING TIME WINDOW

FIELD OF THE INVENTION

This invention relates in general to wireless communication systems, and more specifically to a method and apparatus in a two-way radio messaging unit for limiting a total transmission duration within a sliding time window.

BACKGROUND OF THE INVENTION

The U.S. Federal Communication Commission (FCC) has recently published *Guidelines for Human Exposure to Radiofrequency Electromagnetic Fields* (OET Bulletin 65, Edition 97-01, August 1997). The *Guidelines* specify recommended criteria for localized Specific Absorption Rate (SAR) evaluation. For purposes of the *Guidelines*, a portable device is defined as a transmitting device designed to be used such that the radiating structure(s) of the device is/are within 20 centimeters of the body of the user. For devices which have an inherent property or duty-cycle, the *Guidelines* allow time-averaging over a thirty-minute sliding time window.

Two-way radio messaging units, such as acknowledge-back pagers, can operate within 20 centimeters of the body of the user. It is thus desirable for the transmitters of two-way messaging units to meet the SAR recommendations of the FCC. Two-way messaging unit transmitters historically have operated at relatively low transmit duty cycles, easily complying with the FCC Guidelines. It is conceivable, however, that some future, high-volume data applications could result in higher transmit duty cycles.

Thus, what is needed is a method and apparatus in a two-way radio messaging unit for limiting a total transmission duration within a sliding time window. Preferably, the method and apparatus will maximize throughput of the two-way messaging unit, while providing full compliance with the *Guidelines*.

SUMMARY OF THE INVENTION

An aspect of the present invention is a method in a two-way radio messaging unit for limiting a total transmission duration within a sliding time window of a predetermined duration. The two-way radio messaging unit utilizes a protocol in which information is sent in a plurality of periodically transmitted frames. The method comprises the steps of defining a plurality of bins within the sliding time window, each bin for storing a total transmit duration of a predetermined number of frames assigned to each bin; and determining a mean transmit duration per frame for a next one of the plurality of bins to be processed. The method further comprises the steps of subtracting said mean transmit duration per frame from the total transmit duration of the one of the plurality of bins, when a next frame begins to be processed; and calculating a transmit duty cycle for the sliding time window, the transmit duty cycle calculated as if a requested transmit duration for the next frame were to be allowed. The method also includes the step of delaying a transmission of the next frame, when the transmit duty cycle is greater than a maximum allowable transmit duty cycle.

Another aspect of the present invention is a two-way radio messaging unit for limiting a total transmission duration within a sliding time window of a predetermined duration. The two-way radio messaging unit utilizes a protocol in which information is sent in a plurality of periodically transmitted frames. The two-way radio messaging unit comprises a transceiver for receiving and transmitting information, and a processing system coupled to the transceiver for processing the information and controlling the two-way radio messaging unit. The processing system is programmed to define a plurality of bins within the sliding time window, each bin for storing a total transmit duration of a predetermined number of frames assigned to each bin; and to determine a mean transmit duration per frame for a next one of the plurality of bins to be processed. The processing system is further programmed to subtract said mean transmit duration per frame from the total transmit duration of the one of the plurality of bins, when a next frame begins to be processed; and to calculate a transmit duty cycle for the sliding time window, the transmit duty cycle calculated as if a requested transmit duration for the next frame were to be allowed. The processing system is also programmed to delay a transmission of the next frame, when the transmit duty cycle is greater than a maximum allowable transmit duty cycle.

Another aspect of the present invention is an apparatus for use in a two-way messaging unit including a transmitter, the apparatus for limiting a total transmission duration within a sliding time window of a predetermined duration. The apparatus utilizes a protocol in which information is sent in a plurality of periodically transmitted frames. The apparatus comprises a processing system for controlling the two-way messaging unit. The processing system is programmed to define a plurality of bins within the sliding time window, each bin for storing a total transmit duration of a predetermined number of frames assigned to each bin; and to determine a mean transmit duration per frame for a next one of the plurality of bins to be processed. The processing system is further programmed to subtract said mean transmit duration per frame from the total transmit duration of the one of the plurality of bins, when a next frame begins to be processed; and to calculate a transmit duty cycle for the sliding time window, the transmit duty cycle calculated as if a requested transmit duration for the next frame were to be allowed. The processing system is also programmed to delay a transmission of the next frame, when the transmit duty cycle is greater than a maximum allowable transmit duty cycle.

DETAILED DESCRIPTION OF THE DRAWINGS

Figure 1:
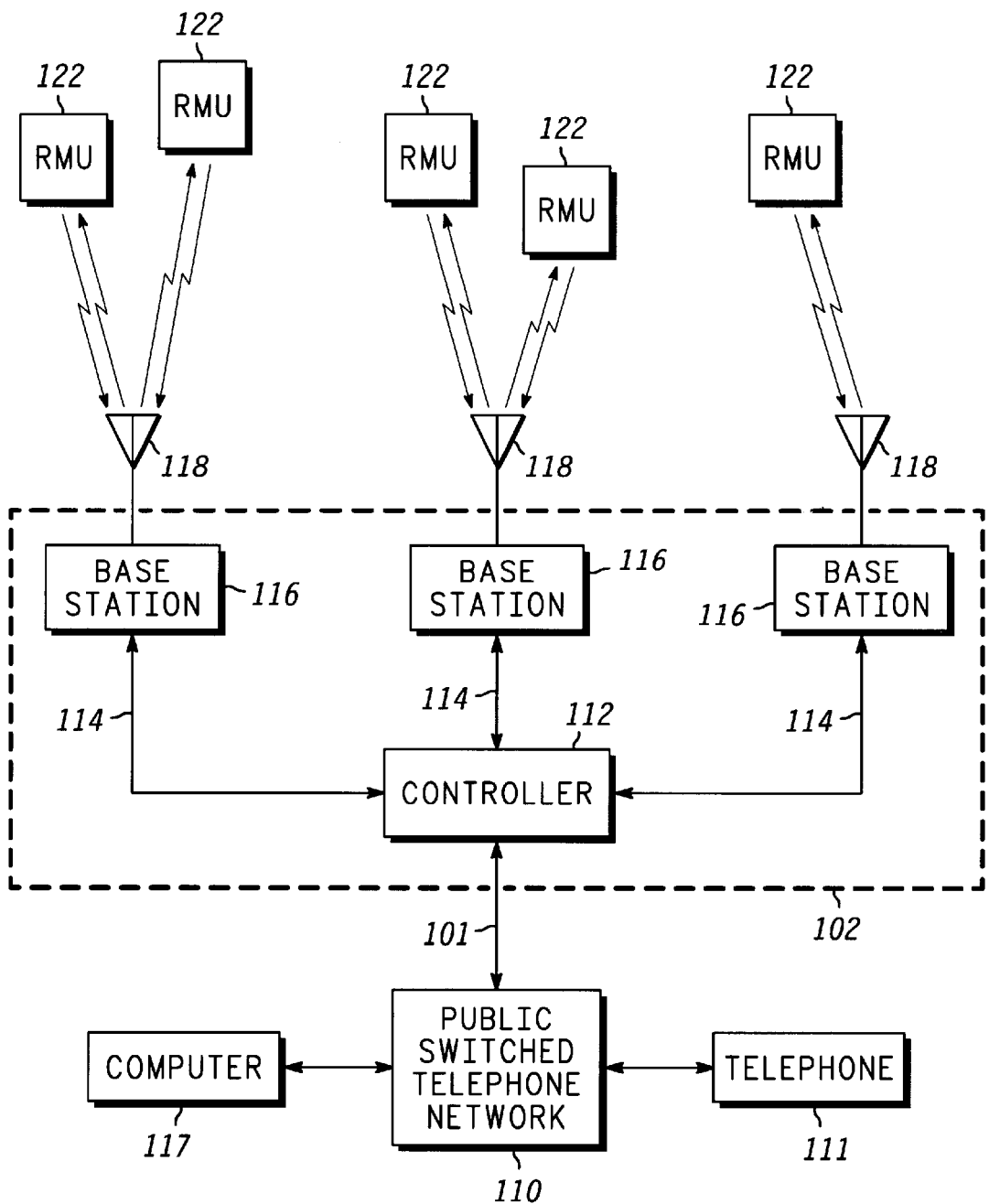
FIG. 1 is an electrical block diagram of an exemplary two-way radio messaging system in accordance with the present invention.

FIG. 1 is an electrical block diagram of an exemplary two-way radio messaging system in accordance with the present invention, comprising a fixed portion 102 including a controller 112 and a plurality of conventional base stations 116, the communication system also including a plurality of radio messaging units 122. The base stations 116 preferably communicate with the radio messaging units 122 utilizing conventional radio frequency (RF) techniques, and are coupled by conventional communication links 114 to the controller 112, which controls the base stations 116.

The hardware of the controller 112 is preferably a combination of a Choreographer!™ network management device, a Wireless Messaging Gateway (WMG™) Administrator!™ terminal, an RF-Usher!™ multiplexer, and an RF-Conductor!™ message distributor manufactured by Motorola, Inc., and utilizes software modified in accordance with the present invention. The hardware of the base stations 116 is preferably a combination of the RF-Orchestra!™ transmitter and the RF-Audience!™ receiver manufactured by Motorola, Inc. The radio messaging units 122 are preferably similar to PageWriter™ 2000 data radio messaging units, also manufactured by Motorola, Inc., and also utilize software modified in accordance with the present invention. It will be appreciated that other similar hardware can be used as well for the controller 112, the base stations 116, and the radio messaging units 122.

Each of the base stations 116 transmits RF signals to the radio messaging units 122 via an antenna 118. The base stations 116 preferably each receive RF signals from the plurality of radio messaging units 122 via the antenna 118. The RF signals transmitted by the base stations 116 to the radio messaging units 122 (outbound messages) comprise selective call addresses identifying the radio messaging units 122, and data messages originated by a message originator, as well as commands originated by the controller 112 for adjusting operating parameters of the radio communication system. The RF signals preferably transmitted by the radio messaging units 122 to the base stations 116 (inbound messages) comprise responses that include scheduled messages, such as positive acknowledgments (ACKs) and negative acknowledgments (NAKs), and unscheduled messages, such as registration requests and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations. It will be further appreciated that the computer 117 can also function as a server for providing various applications and information utilized by the wireless communication system. In that mode, the computer 117 preferably is coupled directly to the controller 112 without going through the PSTN.

The over-the-air protocol utilized for outbound and inbound messages is preferably selected from Motorola's well-known FLEX™ family of digital selective call signaling protocols. These protocols send information in a plurality of periodically transmitted frames of data and utilize well-known error detection and error correction techniques, making them tolerant to bit errors occurring during transmission, provided that the bit errors are not too numerous. It will be appreciated that other suitable protocols can be used as well. It will be further appreciated that the present invention is applicable to many different types of wireless communication systems, including cellular telephone systems, trunked dispatch systems, and voice and data messaging systems, to name a few.

Figure 2:
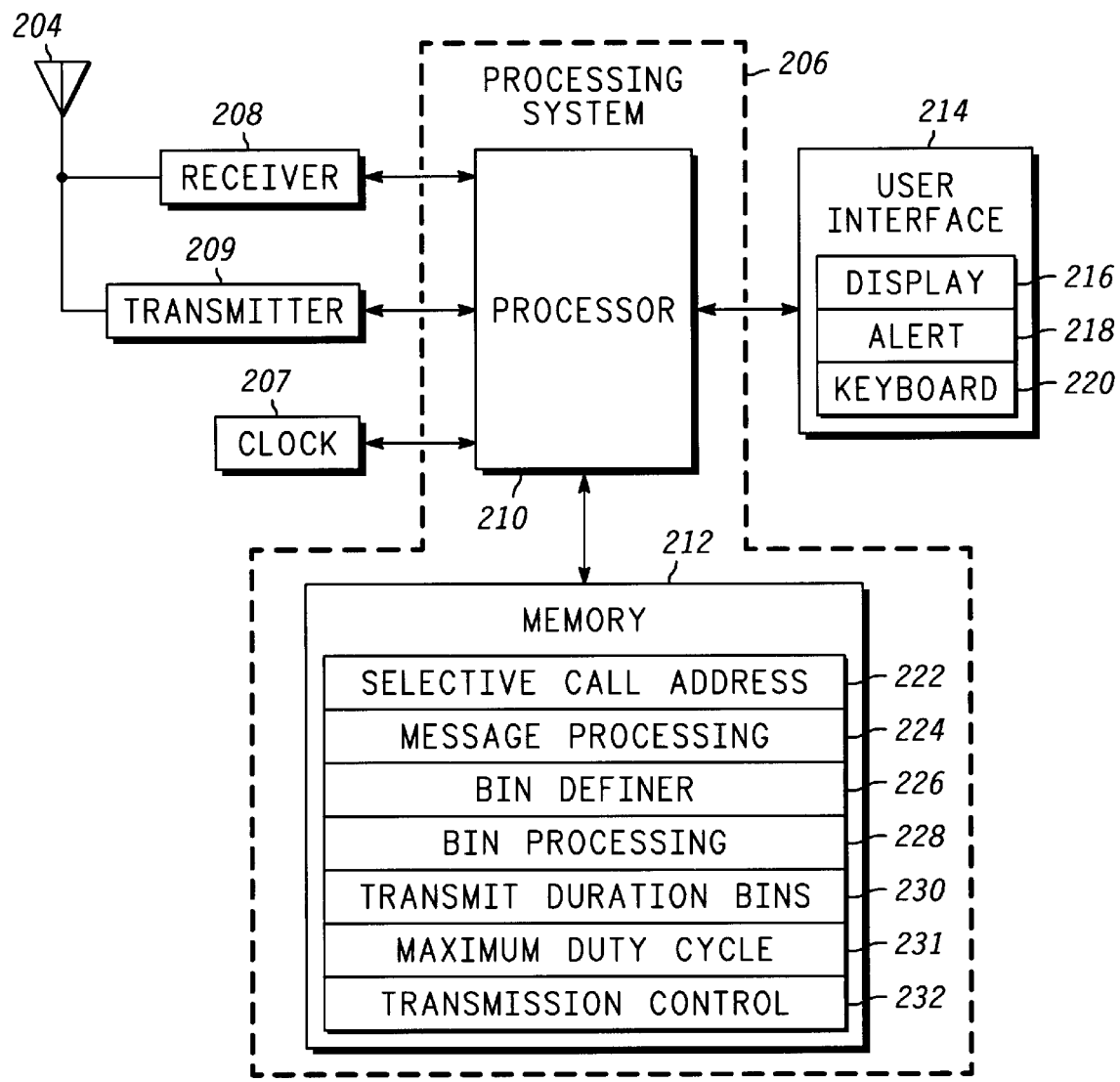
FIG. 2 is an electrical block diagram of an exemplary two-way radio messaging unit in accordance with the present invention.

FIG. 2 is an electrical block diagram of an exemplary two-way radio messaging unit 122 in accordance with the present invention. The radio messaging unit 122 comprises an antenna 204 for intercepting an outbound message and for transmitting an inbound message. The antenna 204 is preferably coupled to a conventional receiver 208 for receiving the outbound message and is coupled to a conventional transmitter 209 for transmitting the inbound message. It will be appreciated that, alternatively, a transceiver can replace the receiver 208 and the transmitter 209. The receiver 208 and transmitter 209 are coupled to a processing system 206 for processing the outbound and inbound messages and for controlling the radio messaging unit 122 in accordance with the present invention. A user interface 214 preferably is also coupled to the processing system 206 for interfacing with a user. The user interface 214 comprises a conventional keyboard 220 for requesting that an operation be performed and for controlling the radio messaging unit 122, a conventional display 216 for displaying the inbound and outbound messages, and a conventional alert element 218 for alerting the user when an outbound message arrives. A conventional clock 207 is also coupled to the processing system 206 for supporting time keeping requirements of the radio messaging unit 122.

The processing system 206 comprises a conventional processor 210, preferably a digital signal processor, and a conventional memory 212. The memory 212 comprises software elements and data for programming the processing system 206 in accordance with the present invention. The memory 212 preferably includes a selective call address 222 to which the radio messaging unit 122 is responsive. In addition, the memory 212 includes a message processing element 224 for programming the processing system 206 to process messages through well-known techniques. The memory 212 further comprises a bin definer program 226 for programming the processing system 206 to define a plurality of transmit duration bins for storing a total transmit duration of a predetermined number of frames assigned to each bin, in accordance with the present invention.

The memory 212 also includes a bin processing program 228 for programming the processing system 206 to process the data of the bins in accordance with the present invention. The memory 212 also includes space for storing the transmit duration bins 230, as well as a pre-programmed maximum allowable transmit duty cycle 231. The memory 212 further comprises a transmission control program 232 for controlling transmissions from the transmitter 209, in accordance with the present invention. Operation of the radio messaging unit 122 in accordance with the present invention will be described in detail further below.

Figure 3:
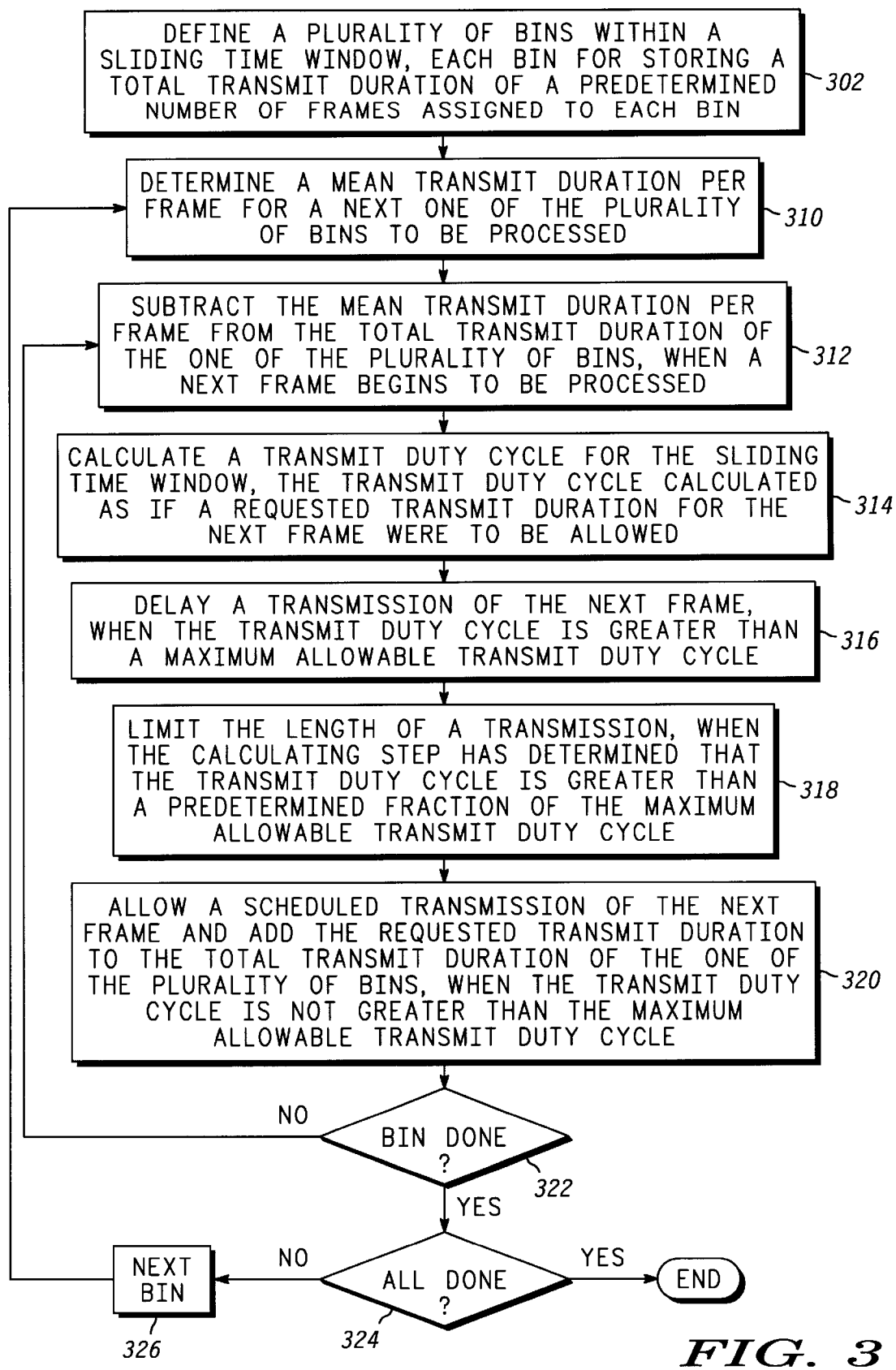
FIG. 3 is a flow diagram depicting operation of the exemplary two-way radio messaging system in accordance with the present invention.

FIG. 3 is a flow diagram depicting operation of the exemplary two-way radio messaging system in accordance with the present invention. Flow begins with the processing system 206 defining 302 a plurality of bins corresponding to a sliding time window, each bin for storing a total transmit duration of a predetermined number of frames assigned to each bin. The processing system 206 preferably designates a number of bins equal to the predetermined duration of the sliding time window, e.g., 1800 sec, divided by a time required for transmitting said predetermined number of frames assigned to each bin, e.g., 60 sec. At step 310 the processing system 206 determines a mean transmit duration per frame for a next one of the plurality of bins to be processed, i.e., the bin containing the oldest data.

The processing system 206 then subtracts 312 the mean transmit duration per frame from the total transmit duration of the one of the plurality of bins, when a next frame of data begins to be processed. The processing system 206 next calculates 314 the transmit duty cycle for the sliding time window, i.e., for all the bins. The transmit duty cycle preferably is estimated as a sum of the total transmit duration stored in each of the plurality of bins, divided by the predetermined duration of the sliding time window. The transmit duty cycle preferably is calculated as if a requested transmit duration for the next frame were to be allowed. (To do that, the requested transmit duration for the next frame is added to the transmit duration tally, before division by the predetermined duration of the sliding time window.) The processing system 206 then delays 316 a transmission of the next frame, when the transmit duty cycle is greater than a maximum allowable transmit duty cycle. In one embodiment, the processing system 206 also can limit 318 the length of a transmission, when the processing system 206 has determined that the transmit duty cycle is greater than a predetermined fraction, e.g., 80 percent, of the maximum allowable transmit duty cycle. In this manner the processing system 206 can "throttle back" the transmitter 209 before the transmit duty cycle reaches a critical value. On the other hand, when the transmit duty cycle is not greater than the maximum allowable transmit duty cycle, the processing system 206 allows 320 a scheduled transmission of the next frame, and adds the requested transmit duration to the total transmit duration of the (oldest) one of the plurality of bins.

At step 322 the processing system 206 checks whether all frames assigned to the bin have been processed. If so, the flow moves to step 324. If not, the flow returns to step 312 to process the next frame. At step 324 the processing system 206 checks whether all the information has been processed. If so, the process ends. If not, the flow moves to step 326 to increment the bin number. The processing system 206 then returns to step 310 to process the next bin.

In somewhat more detail, the transmit limiter in accordance with the present invention limits the total transmit duration over a 30-minute sliding window to less than a specified duty cycle to prevent the device from exceeding the SAR guidelines of the FCC. The processing system 206 attempts to limit the transmit duty cycle to the maximum allowable transmit duty cycle 231 pre-programmed into the processing system 206.

Since the processing system 206 has a limited amount of RAM, the processing system 206 must create transmit time bins by dividing the sliding window time by the duration of the transmit time interval assigned to each bin. Depending upon the number of transmit time bins, the ability of the transmit limiter to maintain the maximum value of the transmit duty cycle can vary somewhat. The transmit limiter assumes that the transmissions performed are uniformly distributed over the transmit time bin. This assumption allows the algorithm to overshoot the desired transmit duty cycle under some conditions, but the maximum amount of overshoot can be calculated and compensated for through adjustments to the maximum allowable transmit duty cycle 231 pre-programmed into the processing system 206.

Algorithm defined constants:

1. Time per transmit time bin, $T_{txBin}$, e.g., 60 sec

Protocol defined constants (FLEX protocol example):

1. Time per frame=$T_{fame}$=1.875 sec
2. Time per cycle=$T_{cycle}$=4 min * 60 sec/min=240 sec FCC defined constant:

1. Transmit Time Window=$T_{window}$=30 min * 60 sec/min= 1800 sec

Device defined constant:

1. Maximum transmit time per frame=$T_{txMax}$, e.g., 1.6 sec

Given the constants, the following values may be calculated;

1. Number of transmit time bins, $N_{bins}=T_{window}/T_{txBin}$, e.g., 30
2. Number of transmit time bins per cycle=$N_{bins/cycle}=T_{cycle}/T_{txBin}$, e.g., 4
3. Number of frames per bin=$N_{frames/bin}=T_{txBin}/T_{frame}$, e.g., 32

To update the transmit time bin for a specific cycle and frame number:

1. Calculate the bin number, n, to update, preferably using the frame and cycle number of the FLEX™ protocol;

$$n = \mod\left(cycle \times N_{bins/cycle} + \left\lfloor \frac{frame}{N_{frames/bin}} \right\rfloor, N_{bins}\right) + 1$$

2. By assuming the distribution of transmits across a transmit time bin is uniform, this allows the radio messaging unit 122 to begin transmitting before the oldest bin number=(n−Nbins) has fallen outside of the sliding time window. The following equation calculates the slope, m, (i.e., the mean transmit duration per frame)

$$m = \frac{Bin(n - N_{bins})}{N_{frames/bin}}$$

to use to update the transmit time bin, number n:

As each new frame passes, a value of m is subtracted from the transmit time bin which increases the remaining usable transmit time, $T_{rem}$.

3. Given the transmit time, $T_{tx}$ for the current frame and cycle, update the transmit time bin number, n:

$$Bin(n)=Bin(n)-m+T_{tx}$$

As the frame and cycle number wrap the 30 minute sliding window, the transmit limiter will subtract time from the current bin value using the slope of the previous bin which is falling off the sliding window and will add time to the current bin value for any transmits made during the bin's frame range. The current bin occupies the same storage location as the previous bin (from 30-minutes ago).

TABLE 1

Transit Time Bin Updating

| Previous Bin | Current Bin |
|---|---|
| Bin(1) | Bin(Nbins + 1) |
| Bin(2) | Bin(Nbins + 2) |
| . | . |
| . | . |
| Bin(n) | Bin(Nbins + n) |
| . | . |
| . | . |
| Bin(Nbins) | Bin(2 × Nbins) |

4. To calculate the transmit duty cycle:

$$DC_{est} = \frac{\sum_{n=1}^{N_{bins}} Bin(n)}{T_{window}}$$

5. To determine if the device has exceeded the SAR limit, calculate the remaining transmit time in the current 30-minute window:

$$T_{rem} = (DC_{ma} - DC_{est}) \times T_{window}$$

where $DC_{ma}$ is the programmed maximum allowable transmit duty cycle 231.

Depending upon the desired accuracy, the time per transmit bin may be adjusted. If the desired accuracy is high, then the time per transmit bin must be reduced. If the desired accuracy is low, then the time per transmit bin can be increased.

The worst case for the transmit limiter is when all transmits are located in the last half of the frames in the transmit time bin that is falling off the sliding window. The algorithm assumes the transmit distribution is uniform across all frames in the bin and allows the unit to begin transmitting, so the actual duty cycle overshoots the desired duty cycle.

To calculate the minimum and maximum transmit duty cycle during maximum loading:

$$DC_{max/min} = DC_{ma} \pm \frac{1}{4} \cdot \frac{T_{txMax} \times T_{txBin}}{T_{window} \times T_{frame}}$$

For bins of 60 sec duration, assumed maximum device transmit time per frame $T_{txMax}=1.6$ sec, and a programmed maximum allowable transmit duty cycle of 10%, the maximum duty cycle is 10.7%, and the minimum duty cycle is 9.3%. The programmed value for $DC_{ma}$ can be reduced to 9.3% to prevent exceeding the example maximum duty cycle value of 10%.

It should be clear from the preceding disclosure that the present invention advantageously provides a method and apparatus in a two-way radio messaging unit for limiting a total transmission duration within a sliding time window of a predetermined duration. Advantageously, the method and apparatus maximizes throughput of the two-way radio messaging unit, while providing full compliance with the FCC SAR *Guidelines*.

Many modifications and variations of the present invention are possible in light of the above teachings. Thus, it is to be understood that, within the scope of the appended claims, the invention can be practiced other than as specifically described herein above.

What is claimed is:

1. A method in a two-way radio messaging unit for limiting a total transmission duration within a sliding time window of a predetermined duration, the two-way radio messaging unit utilizing a protocol in which information is sent in a plurality of periodically transmitted frames, the method comprising the steps of:

defining a plurality of bins within the sliding time window, each bin for storing a total transmit duration of a predetermined number of frames assigned to each bin;

determining a mean transmit duration per frame for a next one of the plurality of bins to be processed;

subtracting said mean transmit duration per frame from the total transmit duration of the one of the plurality of bins, when a next frame begins to be processed;

calculating a transmit duty cycle for the sliding time window, the transmit duty cycle calculated as if a requested transmit duration for the next frame were to be allowed; and delaying a transmission of the next frame, when the transmit duty cycle is greater than a maximum allowable transmit duty cycle.

2. The method of claim 1, wherein the defining step comprises the step of designating a number of bins equal to said predetermined duration of the sliding time window, divided by a time required for transmitting said predetermined number of frames assigned to each bin, and wherein the calculating step comprises the step of estimating the transmit duty cycle as a sum of the total transmit duration stored in each of the plurality of bins, divided by the predetermined duration of the sliding time window.

3. The method of claim 1, further comprising the step of limiting a length of a transmission, when the calculating step has determined that the transmit duty cycle is greater than a predetermined fraction of the maximum allowable transmit duty cycle.

4. The method of claim 1, further comprising the step of allowing a scheduled transmission of the next frame, when the transmit duty cycle is not greater than the maximum allowable transmit duty cycle.

5. The method of claim 4, wherein the allowing step further comprises the step of adding the requested transmit duration to the total transmit duration of the one of the plurality of bins, when the transmit duty cycle is not greater than the maximum allowable transmit duty cycle.

6. The method of claim 4, further comprising the step of repeating the subtracting, calculating, delaying, and allowing steps until the predetermined number of frames assigned to the one of the plurality of bins has been processed.

7. The method of claim 6, further comprising the step of continuing to execute the determining and repeating steps until all the information has been processed.

8. A two-way radio messaging unit for limiting a total transmission duration within a sliding time window of a predetermined duration, the two-way radio messaging unit utilizing a protocol in which information is sent in a plurality of periodically transmitted frames, the two-way radio messaging unit comprising:

a transceiver for receiving and transmitting information; and a processing system coupled to the transceiver for processing the information and controlling the two-way radio messaging unit, wherein the processing system is programmed to:

define a plurality of bins within the sliding time window, each bin for storing a total transmit duration of a predetermined number of frames assigned to each bin;

determine a mean transmit duration per frame for a next one of the plurality of bins to be processed;

subtract said mean transmit duration per frame from the total transmit duration of the one of the plurality of bins, when a next frame begins to be processed;

calculate a transmit duty cycle for the sliding time window, the transmit duty cycle calculated as if a requested transmit duration for the next frame were to be allowed; and delay a transmission of the next frame, when the transmit duty cycle is greater than a maximum allowable transmit duty cycle.

9. The two-way radio messaging unit of claim 8, wherein the processing system is further programmed to:

designate a number of bins equal to said predetermined duration of the sliding time window, divided by a time required for transmitting said predetermined number of frames assigned to each bin; and estimate the transmit duty cycle as a sum of the total transmit duration stored in each of the plurality of bins, divided by the predetermined duration of the sliding time window.

10. The two-way radio messaging unit of claim 8, wherein the processing system is further programmed to limit a length of a transmission, when the calculating step has determined that the transmit duty cycle is greater than a predetermined fraction of the maximum allowable transmit duty cycle.

11. The two-way radio messaging unit of claim 8, wherein the processing system is further programmed to allow a scheduled transmission of the next frame, when the transmit duty cycle is not greater than the maximum allowable transmit duty cycle.

12. The two-way radio messaging unit of claim 8, wherein the processing system is further programmed to add the requested transmit duration to the total transmit duration of the one of the plurality of bins, when the transmit duty cycle is not greater than the maximum allowable transmit duty cycle.

13. An apparatus for use in a two-way messaging unit including a transmitter, the apparatus for limiting a total transmission duration within a sliding time window of a predetermined duration, the apparatus utilizing a protocol in which information is sent in a plurality of periodically transmitted frames, the apparatus comprising:

a processing system for controlling the two-way messaging unit, wherein the processing system is programmed to:

define a plurality of bins within the sliding time window, each bin for storing a total transmit duration of a predetermined number of frames assigned to each bin;

determine a mean transmit duration per frame for a next one of the plurality of bins to be processed;

subtract said mean transmit duration per frame from the total transmit duration of the one of the plurality of bins, when a next frame begins to be processed;

calculate a transmit duty cycle for the sliding time window, the transmit duty cycle calculated as if a requested transmit duration for the next frame were to be allowed; and delay a transmission of the next frame, when the transmit duty cycle is greater than a maximum allowable transmit duty cycle.

14. The apparatus of claim 13, wherein the processing system is further programmed to:

designate a number of bins equal to said predetermined duration of the sliding time window, divided by a time required for transmitting said predetermined number of frames assigned to each bin; and estimate the transmit duty cycle as a sum of the total transmit duration stored in each of the plurality of bins, divided by the predetermined duration of the sliding time window.

15. The apparatus of claim 13, wherein the processing system is further programmed to limit a length of a transmission, when the calculating step has determined that the transmit duty cycle is greater than a predetermined fraction of the maximum allowable transmit duty cycle.

16. The apparatus of claim 13, wherein the processing system is further programmed to allow a scheduled transmission of the next frame, when the transmit duty cycle is not greater than the maximum allowable transmit duty cycle.

17. The apparatus of claim 13, wherein the processing system is further programmed to add the requested transmit duration to the total transmit duration of the one of the plurality of bins, when the transmit duty cycle is not greater than the maximum allowable transmit duty cycle.

* * * * *